United States Patent [19]
Rostoker et al.

[11] Patent Number: 6,131,125
[45] Date of Patent: Oct. 10, 2000

[54] PLUG-AND-PLAY DATA CABLE WITH PROTOCOL TRANSLATION

[75] Inventors: Michael D. Rostoker, Boulder Creek; Joel Silverman, Mt. View, both of Calif.

[73] Assignee: Kawasaki LSI U.S.A., Inc., San Jose, Calif.

[21] Appl. No.: 08/970,992

[22] Filed: Nov. 14, 1997

[51] Int. Cl.[7] .............................. G06F 13/00; G06F 13/60
[52] U.S. Cl. ............................. 709/250; 709/227; 710/72
[58] Field of Search .......................... 395/500; 439/76.1; 710/71, 65, 70, 72, 63; 709/250, 230, 227

[56] References Cited

U.S. PATENT DOCUMENTS

| | | | |
|---|---|---|---|
| H1472 | 8/1995 | Tran ........................................... | 710/71 |
| 4,603,320 | 7/1986 | Farago ....................................... | 341/89 |
| 4,848,287 | 7/1989 | Gillbrand et al. .................. | 123/406.58 |
| 4,884,287 | 11/1989 | Jones et al. ............................... | 710/129 |
| 4,972,470 | 11/1990 | Farago ..................................... | 713/192 |
| 4,993,956 | 2/1991 | Pickles et al. ........................... | 439/76.1 |
| 5,073,852 | 12/1991 | Siegel et al. . | |
| 5,539,787 | 7/1996 | Nakano et al. ........................... | 375/377 |
| 5,574,859 | 11/1996 | Yeh ............................................. | 710/8 |
| 5,664,204 | 9/1997 | Wang ........................................ | 713/300 |
| 5,664,229 | 9/1997 | Bhargava et al. ......................... | 710/65 |
| 5,781,747 | 7/1998 | Smith et al. .............................. | 710/129 |
| 5,793,989 | 8/1998 | Moss et al. ................................ | 710/105 |
| 5,794,014 | 8/1998 | Shetty et al. .............................. | 395/500 |
| 5,822,251 | 10/1998 | Bruce et al. ......................... | 365/185.33 |
| 5,828,905 | 10/1998 | Rao ........................................... | 710/63 |
| 5,832,244 | 11/1998 | Jolley et al. .............................. | 710/129 |
| 5,842,045 | 11/1998 | Nakamura ................................. | 710/63 |
| 5,887,198 | 3/1999 | Houlberg et al. ......................... | 710/62 |
| 5,931,933 | 8/1999 | Billheimer et al. ...................... | 710/129 |
| 5,964,852 | 10/1999 | Overton .................................... | 710/62 |

OTHER PUBLICATIONS

Logic Controls, Inc., IW2000 Intelligent Wedge Cable, Nov. 12, 1997, Web Page.
Smart Cable Company: New Products, Nov. 12, 1997 Web Page.
Methode New England Home Page, Nov. 12, 1997.
B & B Electronics Manufacturing Company Press Release, Oct. 15, 1997 Web Page.
B & B Electronics Manufacturing Company, Oct. 1997 Web Page.

*Primary Examiner*—Dung C. Dinh
*Attorney, Agent, or Firm*—Hickman Coleman & Hughes, LLP

[57] ABSTRACT

A protocol translation cable assembly includes a first connector having a first plurality of pins, a second connector having a second plurality of pins, and an electrical cable coupling the first connector to the second connector, where the electrical cable includes a plurality of conductors. The protocol translation cable assembly further includes translation circuitry coupled to at least some of the plurality of wires of the electric cable at points between the first plurality of pins of the first connector and the second plurality of pins of the second connector. The translation circuitry preferably derives its power from the electrical cable such that separate power supplies are not required. The cable assembly therefore provides transparent "plug-and-play" capabilities.

33 Claims, 9 Drawing Sheets

PLUG-AND-PLAY DATA CABLE WITH PROTOCOL TRANSLATION

CROSS REFERENCE TO RELATED APPLICATIONS

This application is related to U.S. patent application Ser. No. 08/970,736, filed Nov. 14, 1997 on of inventors Michael Aronson and Joel Silverman, entitled "Method and Apparatus for Digital Protocol Translation", which is incorporated herein by reference for all purposes.

DESCRIPTION

1. Technical Field

This invention relates generally to data cables, and more particularly to "smart" data cables which include data translation circuitry.

2. Background Art

There is often a need or a desire to permit the digital electronic communication between two or more digital electronic apparatus. For example, it is often desirable to have a personal computer interfaced with a local area network (LAN). To implement the digital electronic communication between the computer and the network, various communication protocols have been developed. For example, Ethernet is a common communication protocol used in many local area networks.

In practice, in order to network a personal computer, a network card is installed in the computer. Often, the network card includes an Ethernet port. A cable assembly, typically including Ethernet connectors at both ends, can be used to connect the Ethernet port of the network card into the network system.

A problem can sometimes arise when two or more apparatus are configured to communicate with different communication protocols. For example, laptop computers are not often provided with Ethernet cards, and therefore cannot directly communicate with Ethernet networks or other apparatus communicating using Ethernet protocols. One solution is to add a PCMCIA Ethernet card to the portable computer to allow its connection to an Ethernet network. However, standard PCMCIA Ethernet cards have considerable associated overhead from both a hardware and a software point of view. Further, the speed of the Ethernet connection is limited by the speed of the PCMCIA interface. External devices that add Ethernet capabilities to lap-tops undesirably add size and weight to the overall system.

This communication problem will be further explained with reference to FIGS. 1A–1C. In FIG. 1A, a first apparatus 10 is coupled to a second apparatus 12 by a cable assembly 14. Apparatus 10 can be, for example, a personal computer provided with a network card 16 having an Ethernet port (connector) 18. The apparatus 12 can be any number of other types of computer equipment including a network hub, a personal computer, a printer, etc., and is provided with its own network card 20 with Ethernet port (connector) 21. It should be noted that the circuitry of network cards 16 or 20 can be integrated into the electronics of the apparatus 10 or 12, respectively. For example, the circuitry of network card 16 can be provided on the mother board of a personal computer apparatus 10.

The cable assembly 14 includes a first connector 22, a second connector 24, and a cable 26 extending between the two connectors. Connector 22 engages with connector 18 of Ethernet card 16, and connector 24 engages with connector 21 of Ethernet card 20. Since both apparatus 10 and apparatus 12 are communicating with the same communication protocol, i.e. with an Ethernet protocol, a simple connection by cable assembly 14 suffices to place the two pieces of apparatus into digital electronic communication.

A problem arises when two apparatus attempt to communicate using two different communication protocols. For example, in FIG. 1B, it may be desirable to have a first apparatus 10 communicate with a second apparatus 12 which communicates by a different communication protocol. That is, the apparatus 10 might be provided with an Ethernet ported network card 16 while apparatus 12 might be provided with a serial communications (e.g. an RS-232) card 28. In such instances, a translator box 30 can be provided which communicates with an Ethernet communication protocol at a first port 32 and with a serial communication protocol at a second port 34. Devices including interface cards are examples of such translator boxes 30.

In FIG. 1C, a first apparatus 10 is coupled to a second apparatus 12 by a "smart" cable 36. In an example, the apparatus 10 has a card 38 communicating with a first communication protocol, and apparatus 12 has a card 40 communicating with a second communication protocol. However, instead of having a separate translator box 30 as explained with reference to FIG. 1B, the smart cable 36 of FIG. 1C includes embedded circuitry for translating the communication protocol of apparatus 10 into the communication protocol for apparatus 12. For example, apparatus 10 can be a personal computer having a USB card 38 and apparatus 12 can be a printer having a parallel or Centronics card 40. The smart cable 36 then translates the USB protocols of apparatus 10 into Centronics protocols of apparatus 12 and vice versa. The digital circuitry of the smart cable can be located within a connector 42 or a connector 44 of the cable or can be part of the cable 46, e.g. in the form of a dongle 48.

There are several examples of smart cables that are commercially available. For example, Methode New England provides smart cables with built-in termination, hot swap circuitry, and dongle integration. The Smart Cable Company of Tacoma, Washington produces a FC819/825 smart serial to parallel cable which automatically adjusts itself for serial to parallel or parallel to serial conversion. Logic Control, Inc. markets the IW 2000 Intelligent Wedge Cable which converts RS232 or decoded TTL serial data to keyboard data. Also, B&B Electronics Manufacturing Company markets the model USBP10 cable which allows USB ports to be coupled to parallel printers.

The problem with the current generation of smart cables is that they are only available for a limited number of rather simple protocol conversions, and they are not easily upgradable. Also, many of these devices require software drivers to be loaded onto a host computer in order to operate properly. Further, most of these devices require either a relatively large connector (such as Centronics connector), or a bulky dongle, to house the translation circuitry. This is because the translation circuitry as associated printed circuit (PC) board tends to be quite bulky.

In addition, even "smart" cables are not typically "plug-and-play." That is, typically drivers are required on the host computer to which the cable is attached to properly operate the smart cable. Therefore, the smart cables of the prior art tend not to be "transparent" from the user's point of view.

DISCLOSURE OF THE INVENTION

The present invention includes a smart, plug-and-play cable capable of transparently translating between two different communication protocols. The cables are preferably "plug-and-play" such that two devices can be coupled together for communication without the requirement that the user perform any special set-up steps in order for it to work. To implement this plug-and-play functionality, the smart cable of the present invention determines which communication protocols are required at each of its ports, and selects, activates, enables, or downloads the appropriate communication protocol drivers to enable proper operation.

More particularly, a protocol translation cable assembly of the present invention includes a first connector having a first plurality of pins, a second connector having a second plurality of pins, and an electrical cable coupling the first connector to the second connector, where the electrical cable includes a plurality of conductors. The protocol translation cable assembly further includes translation circuitry coupled to at least some of the plurality of wires of the electric cable at points between the first plurality of pins of the first connector and the second plurality of pins of the second connector. The translation circuitry preferably derives its power from the electrical cable such that separate power supplies are not required.

The translation circuitry further includes a first protocol processor communicating with the first connector and a second protocol processor communicating with the second connector, where the first protocol processor and the second protocol processor are coupled together for mutual communication. In operation, the first protocol processor is capable of communicating with a first apparatus via the first connector with the first protocol, and the second protocol processor is capable of communicating with the second apparatus via the second connector with a second protocol, where the first protocol is different from the second protocol.

There are a number of disclosed embodiments of the present invention. In the first embodiment, the first protocol is a first fixed protocol, such as a USB protocol, and when the second protocol is a second fixed protocol, such as an Ethernet protocol. In another embodiment of the invention, the translation circuitry includes memory coupled to at least one of the first protocol processor and a second protocol processor. The memory, which can be read only memory (ROM), random access memory (RAM), or both, can store program instructions to implement various communication protocols. In one embodiment, a number of communication protocol drivers are stored in read only memory, and an appropriate driver is chosen from the library of available communication protocol drivers. In another embodiment of the present invention, an appropriate communication protocol driver is downloaded from an apparatus connected to the translation cable assembly and is stored in the random access memory. An appropriate communication protocol for each of its two ports can be determined by examining the signals on the pins of its connectors, as is well known to those skilled in the art.

A method for plug-and-play compatibility between a first apparatus capable of digitally communicating with a first protocol through a first apparatus connector and a second apparatus capable of digitally communicating with a second protocol through a second apparatus connector includes: detecting at a first apparatus connector a first communication protocol; enabling a first protocol interface in a first protocol processor; detecting at a second apparatus connector a second communication protocol; enabling a second protocol interface in a second protocol processor; translating digital communications provided at the first apparatus connector in the first protocol into digital communications at the second apparatus connector in the second protocol; and translating digital communications provided at the second apparatus connector in the second protocol and digital communications at the first apparatus connector in the first protocol.

A single chip protocol translator in accordance with the present invention includes a unitary semiconductor substrate integrating translation circuitry including a first protocol processor and a second protocol processor. The first protocol processor and the second protocol processor are coupled together for mutual communication such that the first protocol processor is capable of communicating with external devices with the first protocol and such that the second protocol processor is capable of communicating with the external devices of the second protocol.

These and other advantages of the present invention will become apparent to those skilled in the art upon a reading of the following descriptions and a study of the several figures of the drawings.

BEST MODES FOR CARRYING OUT THE INVENTION

Figure 1A:
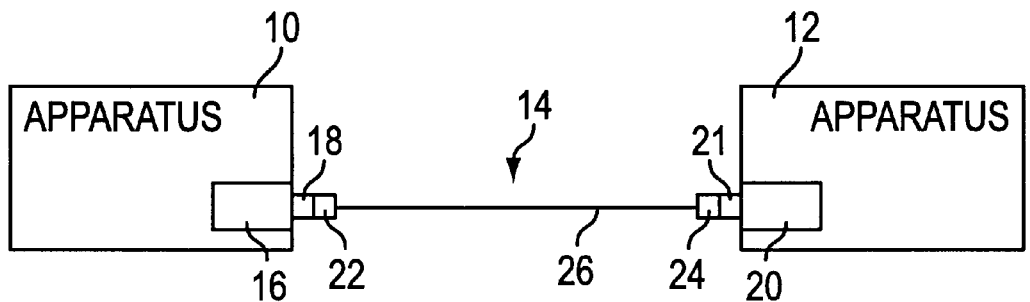
FIGS. 1A–1C are pictorial illustrations used in a discussion of the prior art.
Figure 1B:
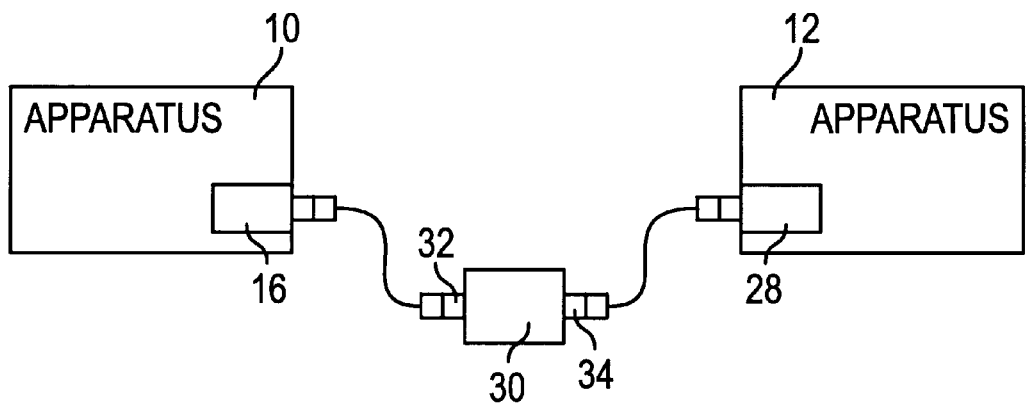
Figure 1C:
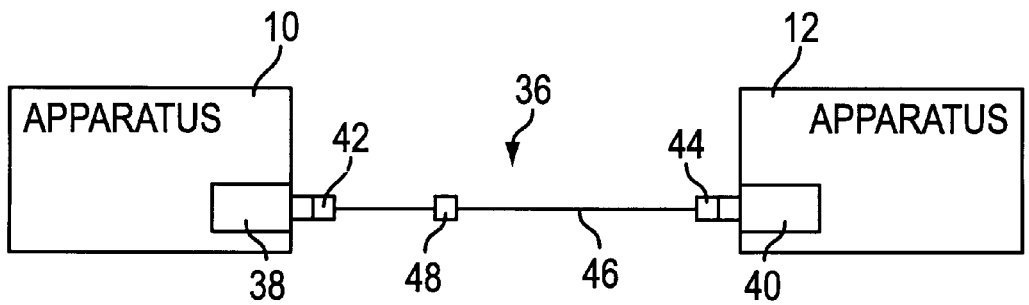
Figure 2:
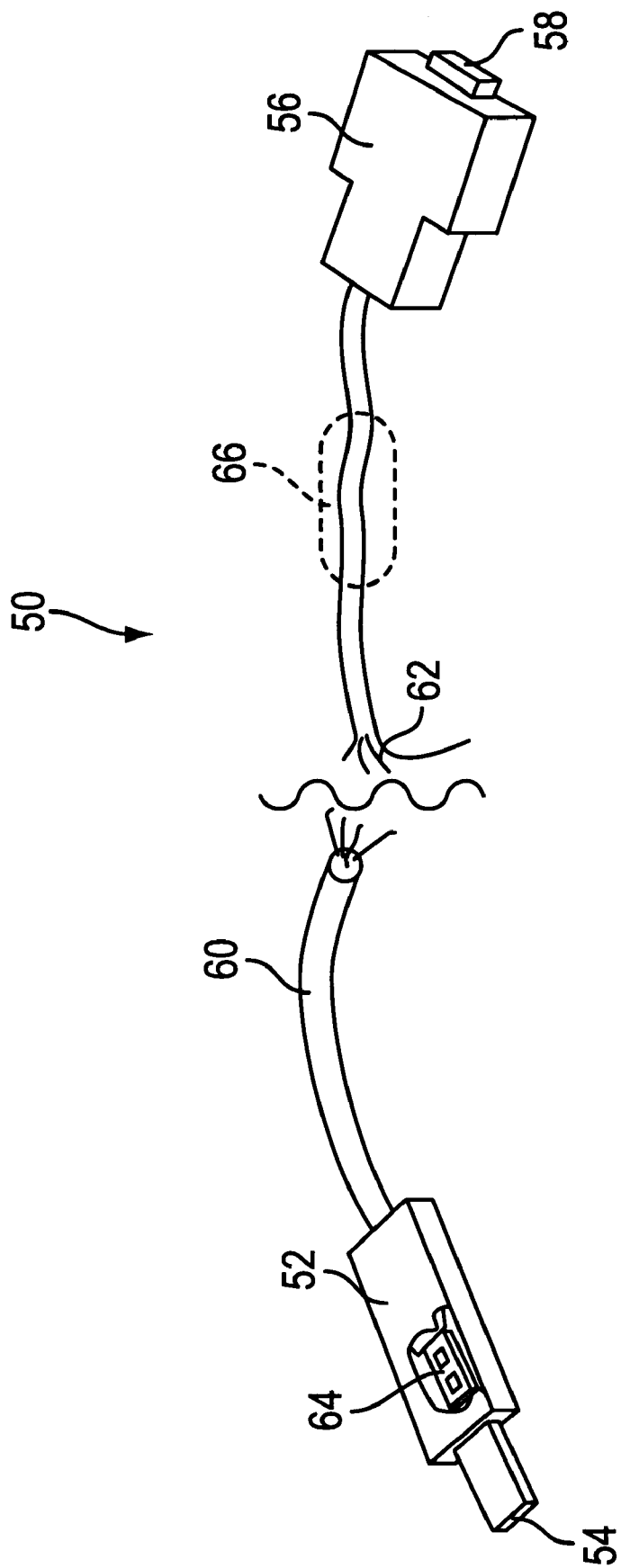
FIG. 2 is a perspective view of a smart cable in accordance with the present invention.

FIGS. 1A–1C were discussed with reference to the prior art. In FIG. 2, a protocol translation cable assembly 50 in accordance with present invention includes a first connector 52 having a first plurality of pins 54, a second connector 56 having a second plurality of pins 58, and an electrical cable 60 coupling the first connector 52 to the second connector 56. The electrical cable 60 includes a number of conductors 62 for signals, power, ground, etc.

The protocol translation cable assembly 50 also includes translation circuitry 64 coupled to at least some of the wires of the electrical cable 60 at points between the free ends of a first plurality of pins 54 and the free ends of a second plurality of pins 58. By this it is meant that the translation circuitry 64 is formed as part of the protocol translation cable assembly 50, and is not a separate component from the protocol translation cable assembly 50. Alternatively to being housed within a connector 52, the translation circuitry 64 of the present invention can be provided within a dongle 66 (here shown in phantom), as will be appreciated by those skilled in the art.

In the illustration of FIG. 2, the first connector 52 is a Universal Serial Bus (USB) connector which connects to a USB port for communication with a USB communication protocol. The connector 56, in this example, is an Ethernet connector which can connect to an Ethernet port for communication with an Ethernet communication protocol. Both USB and Ethernet communication protocols are well known to those skilled in the art.

While the present invention will discussed in terms of the example of FIG. 2, it should be noted that there are a great many types of communication protocols that are applicable to the method and apparatus for the present invention. In addition to USB and Ethernet protocols there are 1394 (Fire Wire), SCSI, modem, wireless, video, printer, and serial protocols, and more. It will therefore be appreciated that the methods and apparatus of the present invention are applicable to smart, "plug-and-play" cable assemblies where the cable communicates with a first communication protocol at a first end, and a second communication protocol at the second end. A specific implementation of the translation circuitry 64 is shown in a top plan view in FIG. 3A and in a side elevational view in FIG. 3B, which is a view taken along line 3B—3B of FIG. 3A.

Figure 3A:
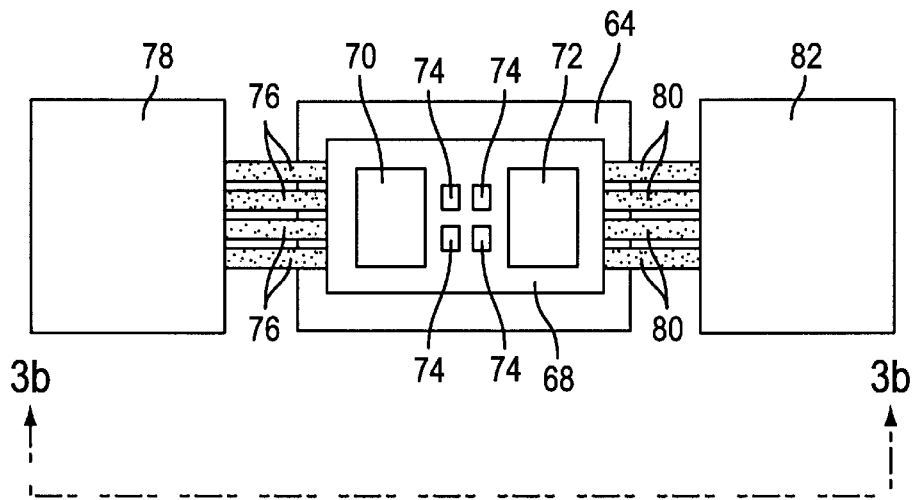
FIGS. 3A and 3B are top plan and side elevation views, respectively, of translation circuitry in accordance with the present invention.
Figure 3B:
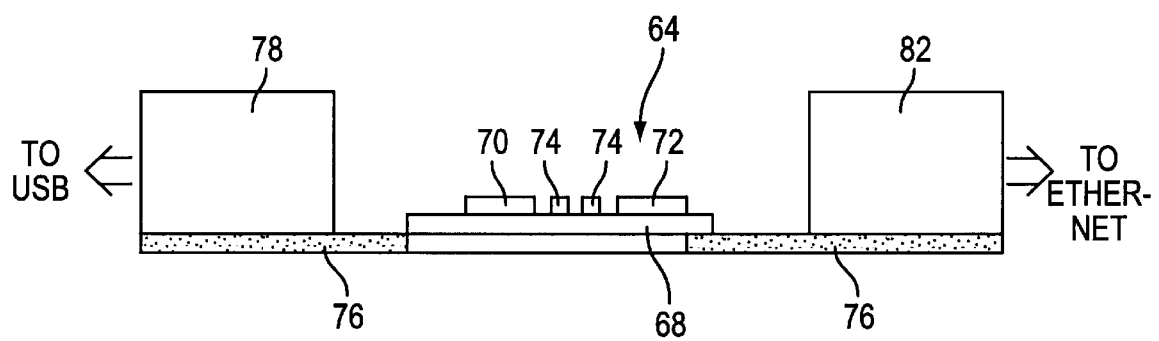

Referring collectively to FIGS. 3A and 3B, the translation circuitry 64 is supported by a PC board or substrate 68 having conductive "traces" which connects to the various components of the translation circuitry 64. Some of these components include a first protocol translator 70, a second protocol translator 72, and a number of other integrated circuits or small devices 74. Conductive fingers 76 connect the circuit board 68 to a first plastic connector 78, and connective fingers 80 connect the circuit board 68 to a second plastic connector 82. The first plastic connector 78 is coupled to the USB pins, while the second plastic connector is used to couple to the Ethernet side of the cable.

The various components of the present invention are preferably made with as small of a form factor as possible to permit the translation circuitry 64 to be enclosed within one of the end connectors of the cable assembly. In this example, the translation circuitry 64 is fully enclosed within the metal housing of a USB connector 52. Alternatively, it could be housed within the Ethernet cable 56, or within a dongle 66.

Figure 4A:
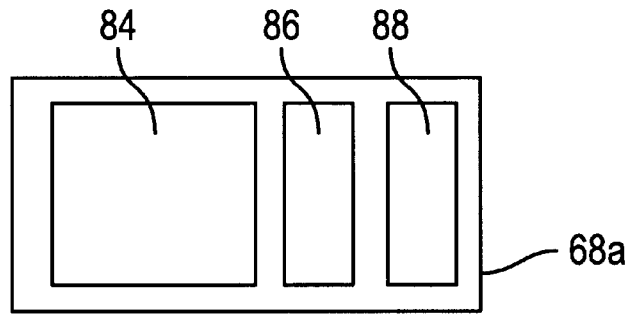
FIGS. 4A–4C illustrate different levels of integration and different form factors for the translation circuitry of the present invention.
Figure 4B:
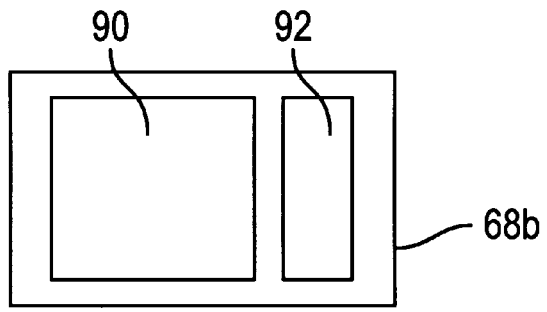
Figure 4C:
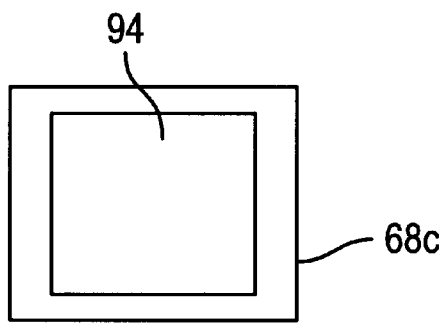

In FIGS. 4A–4C, four different "form factors" are illustrated. In FIG. 4A, a small, rectangular printed circuit board 68A holds three components 84, 86, and 88. In this example, device 84 is an integrated circuit which includes most of the translation circuitry but does not include, for example, circuitry such as a PHY circuitry 86. In addition, a transformer 88 may be required for certain (e.g. Ethernet) applications.

In FIG. 4B, a smaller form factor circuit board 68B includes a pair of devices 90 and 92. The device 90, for example, is a fully integrated translation circuit, while device 92 can be, for example, a transformer device.

In FIG. 4C, a still smaller form factor printed circuit board 68C holds a single integrated circuit chip 94 which includes all the necessary translation circuitry. Also, depending on the packaging type for the integrated circuit 94, the printed circuit board 68C may be eliminated to create a even smaller form factor. Therefore, a preferred embodiment of the present invention minimizes the number of individual devices to create as small as possible of a form factor. For example, the integrated circuit 94 alone can have a form factor of approximately ⅜×⅜ inches when using surface mount integrated circuit packaging technologies. However, with certain "packageless" technologies such as flip-chip and chip-on-board technologies, the form factor can be even smaller.

Figure 5:
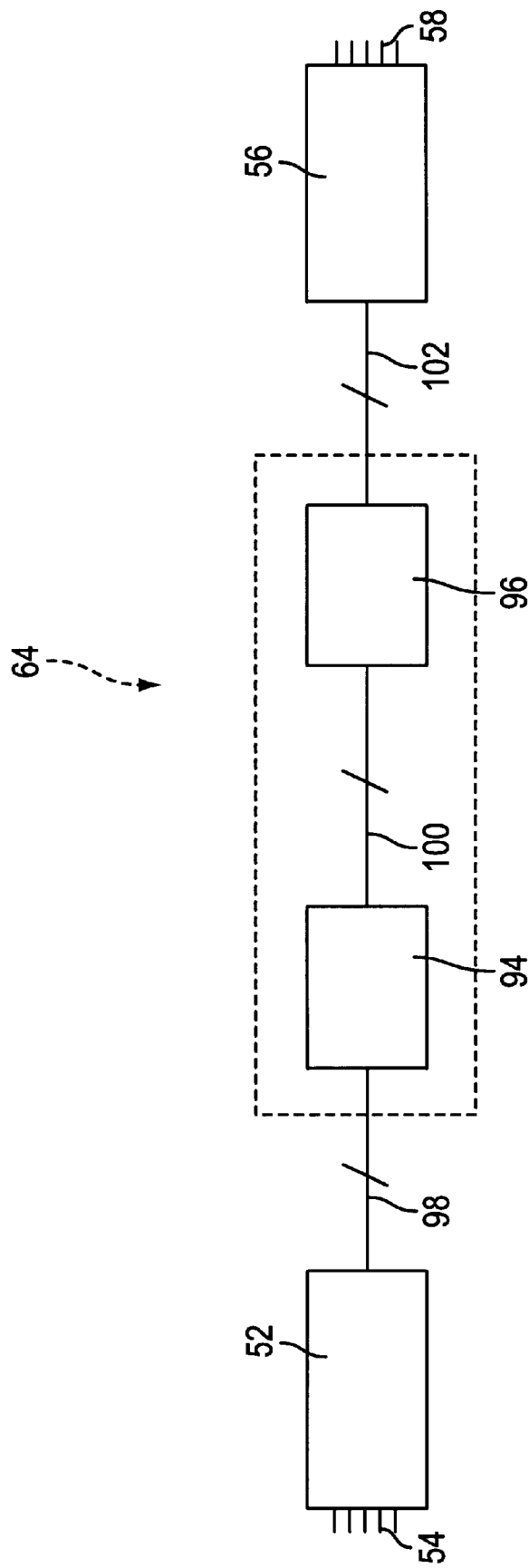
FIG. 5 is a block diagram of the protocol translation cable assembly of the present invention.

In FIG. 5, a block diagram of the electrical components of cable assembly 50 is illustrated. The translation circuitry 64 includes a first protocol processor 94 and a second protocol processor 96. The first protocol processor, in this instance a USB protocol processor, is coupled to the USB connector 52 by wires 98. The first protocol processor is also coupled to the second protocol processor 96, in this instance the Ethernet protocol process, by a number of conductors 100, typically conductive traces on the substrate PC board. The second protocol processor 96 is coupled to the Ethernet connector 56 by a number of wires 102.

When the USB connector 52 is engaged with a complimentary USB connector, USB protocol communication signals on pins 54 are transmitted via wires 98 into the USB protocol processor 94. These processed signals are placed on conductors 100 and further processed within the second protocol processor 96 to rate signals on wires 102. When connector 56 is coupled to a complimentary Ethernet connector, signals within Ethernet communication protocol are present on pins 58. Since the cable assembly 50 of the present invention is full-duplex, Ethernet-to-USB communication protocol translation operates in the same manner as described previously, but in the opposite direction.

Figure 6:
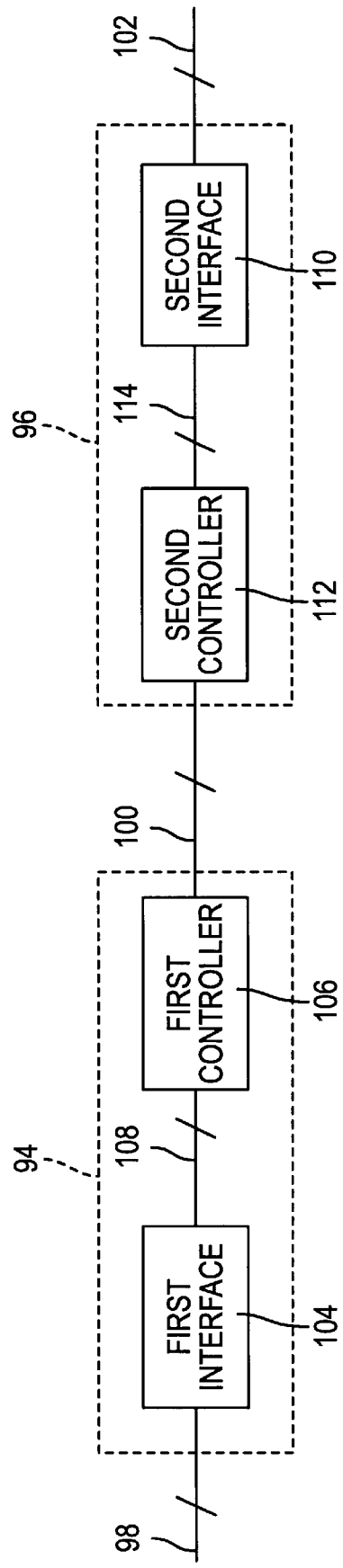
FIG. 6 is a more detailed block diagram of an embodiment of the present invention.

In FIG. 6, a preferred embodiment for the first protocol processor 94 and the second protocol processor 96 are illustrated in block diagram form. In this embodiment, the first protocol processor 94 includes a first interface 104 and a first controller 106 that is coupled to the first interface 104 by conductors 108. Similarly, the second protocol processor 96 includes a second interface 110 and a second controller 112 coupled to the second interface 110 by wires 114.

The first interface 104 performs the communications with the USB device with which it is attached under the control of the first controller 106. The combination of the first interface 104 and the first controller 106 performs translation services which are provided to the second protocol processor 96 over wires 100. Similarly, the second interface 110 performs Ethernet communication services with an Ethernet apparatus to which it is attached under the control of the second controller, and the second controller 112 and the second interface 110 collectively provide translation services for the first protocol processor 94.

In the embodiment of FIG. 6, it can be assumed that the communication protocols of the cable assembly 50 are fixed. For example, the communication protocol can be USB at one end of the cable and Ethernet at the other end of the cable. However, as pointed out previously, other combinations are also possible. In this embodiment, the first controller 106 and the second controller 112 can be simple sequential logic devices such as state machines. Alternatively, the first controller 106 and the second controller 112 can be programmed microprocessors, as explained below.

Figure 7:
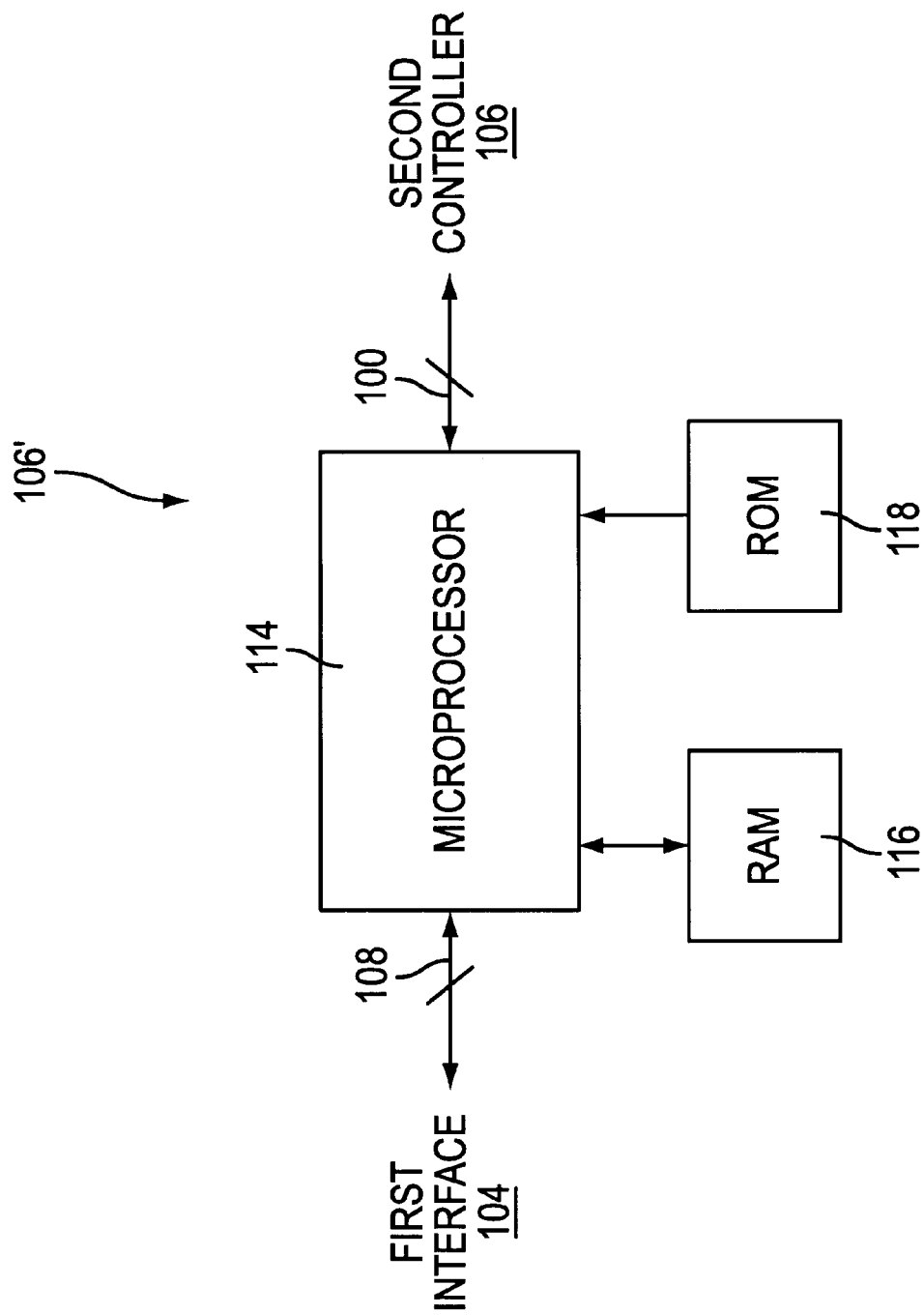
FIG. 7 is a block diagram of a first controller of an embodiment of the present invention.

In FIG. 7, an embodiment for a first controller 106' is illustrated in block diagram form. It should be understood that a second controller 112' (not shown) can be of similar design. The first controller 106' includes a microprocessor 114 which is coupled to a RAM 116 and a ROM 118. The microprocessor 114 also communicates with the first interface 104 through the conductors 108 and to the second controller 106 through the conductors 100. The advantage of using a microprocessor over a state machine is that the program stored in instructions of RAM 116 can be updated by downloading new instructions, communication protocols, etc. from one or more of the apparatus to which the cable assembly 50 is attached. In addition, complex processes and multiple protocols can be efficiently handled using a microprocessor.

Figure 8:
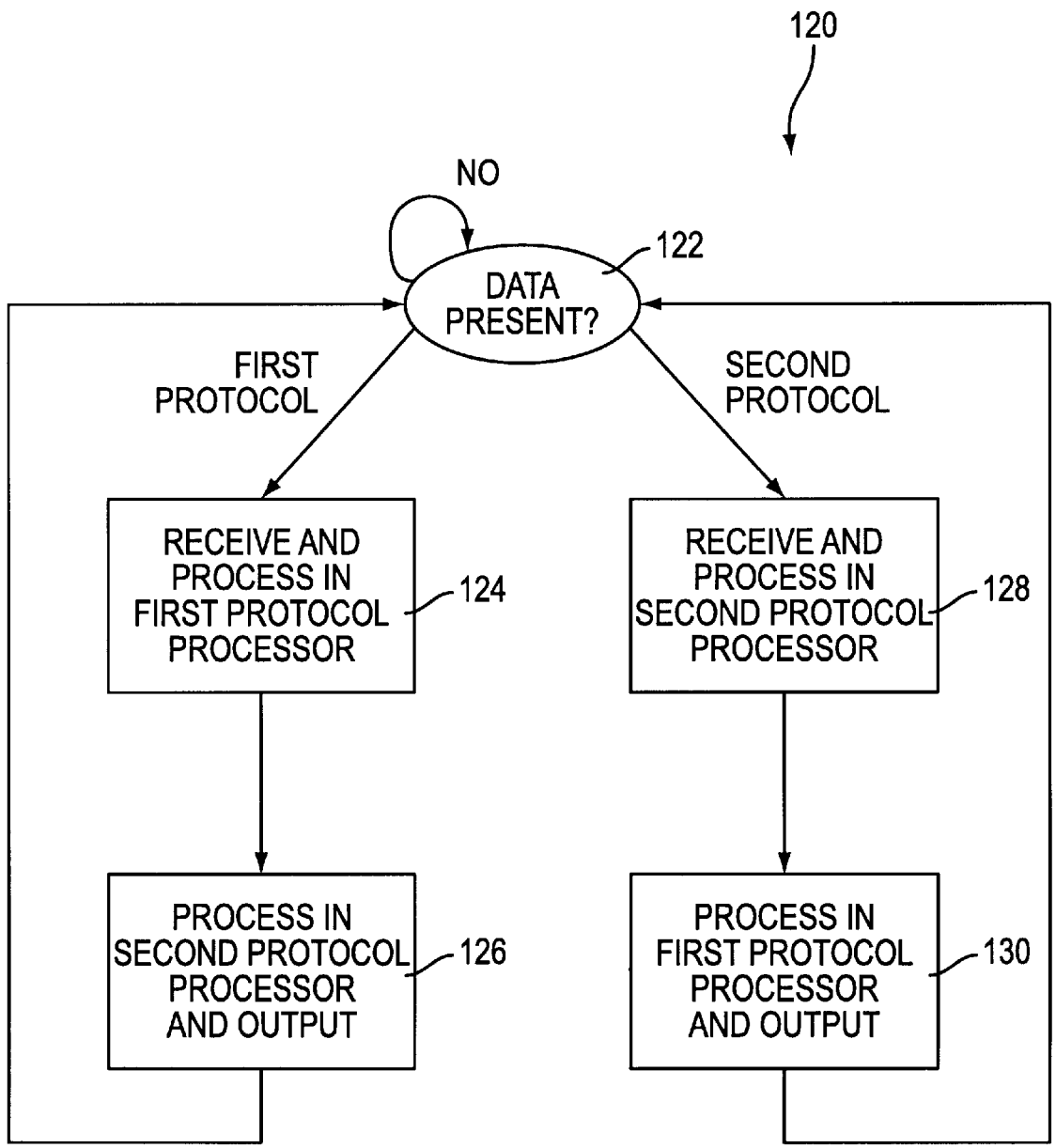
FIG. 8 is a flow diagram of the translation process of the present invention.

In FIG. 8, a process 120 for performing translation is illustrated in flow diagram form. The process 120 begins in the wait loop 122 where the controller is waiting for indication that some data is present at a connector of the cable assembly. If data is present at the first connector, the first protocol process is evoked with an action 124 of receiving and processing the data in the first protocol processor. Next, an action 126 processes the data in the second protocol processor and output its on the connector on the opposite side. Process control then returns to the wait loop 122.

If data is determined to be present at the second connector, the second protocol process is evoked wherein the data is received and processed in the second protocol processor in action 128, and it is then processed in the first protocol processor and an output in action 130. Process control then returns to the wait loop 122.

In this fashion, full-duplex operation of the cable assembly 50 permits the transparent translation between different communication protocols of two different apparatus. Data entering the cable assembly at one end with a first protocol is output at the other end with the second protocol, and data entering the second end with the second protocol is output from the first end with the first protocol.

Figure 9:
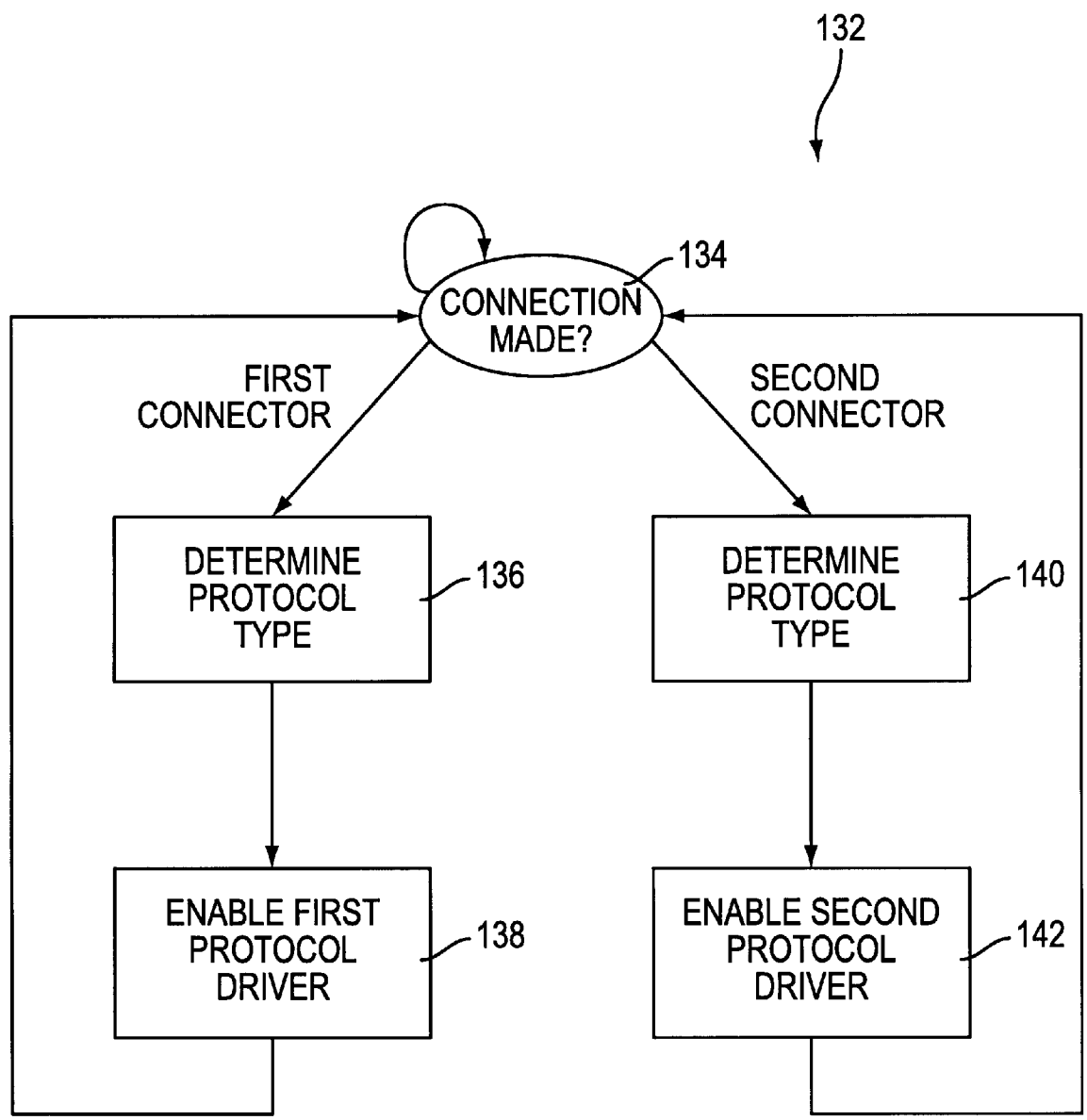
FIG. 9 is a flow diagram of the plug-and-play process of the present invention.

In FIG. 9, the process 132 illustrates the "plug-and-play" process of the cable assembly 50 of the present invention. An interrupt loop 134 determines if either connector of the cable is plugged into an apparatus, or if the apparatus had just "powered-up." If the first connector has made such a connection, or on power-up, action 136 determines the communication protocol type of the device to which that first connector is engaged. Next, an action 138 enables a first protocol driver of the first protocol processor.

If the second connector is connected to an apparatus, or on power-up, an action 140 determines the protocol type of that apparatus. Action 142 then enables the second protocol driver, and process control is returned to the interrupt loop 134.

The "plug-and-play" capabilities of the present invention can be implemented in several preferred fashions. With additional reference to FIG. 7, a number or "library" of communication protocol drivers can be stored within the ROM 118 and can be selected by the action 138 after the protocol type has been recognized by action 136. Analogously, a number of or library of communication protocol drivers can be stored within a ROM of the second controller 112 such that action 142 can choose the appropriate communication protocol driver from a library of drivers as determined by the protocol type in action 140. Alternatively, a number of communication protocol drivers an be downloaded into the RAM memory 116 or to non-volatile read/write memory such as flash memory (not shown).

Another embodiment of the present invention implements plug-and-play by downloading an appropriate communication protocol driver from the host machine to which it is connected. For example, when the USB connector is connected to a host computer, the host computer can download a current USB communication protocol driver to be stored in RAM memory. A similar process can also be performed on the Ethernet side of the translation circuitry. An advantage of being able to download drivers is that the cable assembly 50 can be upgraded with new drivers as they become available. However, this flexibility to improve the functionality of the cable assembly comes with the burden of having to install and update drivers on the host machines as they become available.

While the present invention has been described in terms of several preferred embodiments, it will be appreciated various modifications, permutations, and equivalents of these preferred embodiments will become clear to those skilled in the art upon a reading of the forgoing descriptions and a study of the drawings. It is therefore intended that the following appended claims include all such modifications, permutations, and equivalents as fall within the true spirit and scope of the present invention.

What is claimed is:

1. A protocol translation cable assembly comprising:

a first connector having a first plurality of pins;

a second connector having a second plurality of pins;

an electrical cable coupling said first connector to said second connector, said electrical cable including a plurality of conductors; and translation circuitry coupled to at least some of said plurality of conductors of said electrical cable at points between ends of said first plurality of pins of said first connector and ends of said second plurality of pins of said second connector, said translation circuitry deriving its power from said electrical cable, said translation circuitry including a first protocol processor communicating with said first connector and a second protocol processor communicating with said second connector, said first protocol processor and said second protocol processor being coupled together for mutual communication, such that said first protocol processor is capable of communicating with a first apparatus via said first connector with said first protocol and such that said second protocol processor is capable of communicating with a second apparatus via said second connector with said second protocol;

wherein each of said first and said second protocol is selected from the group consisting of a USB, an Ethernet, a Fire wire, a SCSI, a modem, a wireless, a video, a printer, and a serial protocols.

2. A protocol translation cable as recited in claim 1, wherein said first protocol is a USB protocol, and wherein said second protocol is an Ethernet protocol.

3. A protocol translation cable assembly comprising:

a first connector having a first plurality of pins;

a second connector having a second plurality of pins;

an electrical cable coupling said first connector to said second connector, said electrical cable including a plurality of conductors; and translation circuitry coupled to at least some of said plurality of conductors of said electrical cable at points between ends of said first plurality of pins of said first connector and ends of said second plurality of pins of said second connector, said translation circuitry deriving its power from said electrical cable, said translation circuitry including a first protocol processor communicating with said first connector and a second protocol processor communicating with said second connector, said first protocol processor and said second protocol processor being coupled together for mutual communication, such that said first protocol processor is capable of first communicating with a first apparatus via said first connector with said first protocol and such that said second protocol processor is capable of communicating with a second apparatus via said second connector with said second protocol, said first protocol being different from said second protocol.

4. A protocol translation cable as recited in claim 3 wherein said translation circuitry further includes memory coupled to at least one of said first protocol processor and said second protocol processor.

5. A protocol translation cable as recited in claim 4 wherein said first protocol is implemented with a first driver stored in said memory, and wherein said second protocol is implemented with a second driver stored in said memory.

6. A protocol translation cable as recited in claim 5, wherein said memory is a read-only memory including a collection of drivers, and wherein said at least one of said first protocol processor and said second protocol processor determines an appropriate driver for at least one of said first driver and said second driver selected from said collection of drivers.

7. A protocol translation cable as recited in claim 6, wherein said at least one of said first protocol processor and said second protocol processor determines said appropriate driver by an analysis of electrical signals present upon said plurality of pins of at least corresponding one of said first connector and said second connector.

8. A protocol translation cable as recited in claim 5, wherein said memory is a read/write memory including a collection of drivers, and wherein said at least one of said first protocol processor and said second protocol processor determines an appropriate driver for at least one of said first driver and said second driver selected from said collection of drivers.

9. A protocol translation cable as recited in claim 8, wherein said at least one of said first protocol processor and said second protocol processor determines said appropriate driver by an analysis of electrical signals present upon said plurality of pins of at least corresponding one of said first connector and said second connector.

10. A protocol translation cable as recited in claim 5, wherein said memory is a read/write memory, and wherein at least one of said first driver and said second driver are loaded into said read/write memory through at least one of said first connector and said second connector.

11. A protocol translation cable as recited in claim 3 wherein said first protocol is a first fixed protocol and wherein said second protocol is a second fixed protocol.

12. A single chip protocol translator comprising:
a unitary semiconductor substrate integrating translation circuitry including a first protocol processor and a second protocol processor, said first protocol processor and said second protocol processor being coupled together for mutual communication, such that said first protocol processor is capable of communicating with first external devices with a first protocol and such that said second protocol processor is capable of communicating with second external devices with a second protocol, said first protocol being different from said second protocol; wherein said translation circuitry includes memory coupled to at least one of said first protocol processor and second protocol processor, and wherein said first protocol is implemented with a first driver stored in said memory and said second protocol is implemented with a second driver stored in said memory.

13. A single chip protocol translator as recited in claim 12, wherein said memory stores a collection of drivers, and wherein said at least one of said first protocol processor and said second protocol processor selects an appropriate driver for at least one of said first driver and said second driver selected from said collection of drivers.

14. A single chip protocol translator as recited in claim 12, wherein at least one of said first driver and said second driver is loaded into said memory from at least one of said first external devices and said second external devices.

15. A method for plug-and-play compatibility between a first apparatus capable of digitally communicating with a first protocol through a first apparatus connector and a second apparatus capable of digitally communicating with a second protocol through a second apparatus connector, said method comprising:
determining a first communication protocol received at a first apparatus connector;
enabling a first protocol driver appropriate to said determined first protocol in a first protocol processor;
determining a second communication protocol received at a second apparatus connector;
enabling a second protocol driver appropriate to said determined second protocol in a second protocol processor;
translating digital communications provided at said first apparatus connector in said first protocol into digital communications at said second apparatus connector in said second protocol through said first protocol processor and then said second protocol processor; and
translating digital communications provided at said second apparatus connector in second protocol into digital communications at said first apparatus connector in said first protocol through said second protocol processor and then said first protocol processor.

16. A method for plug-and-play compatibility as recited in claim 15, wherein enabling said first protocol driver includes selecting said first protocol driver from a collection of drivers stored in a memory coupled to said first protocol processor.

17. A method for plug-and-play compatibility as recited in claim 15, wherein enabling said first protocol driver includes downloading said first protocol driver through said first apparatus connector to a memory coupled to said first protocol processor.

18. A method for plug-and-play compatibility of a protocol translation circuitry, said method comprising:
determining a first communication protocol received at a first group of terminals of said protocol translation circuitry;
enabling a first protocol driver appropriate to said determined first protocol in a first protocol processor within said protocol translation circuitry;
determining a second communication protocol received at a second group of terminals of said protocol translation circuitry;
enabling a second protocol driver appropriate to said determined second protocol in a second protocol processor within said protocol translation circuitry;
translating digital communications in said first protocol provided at said first group of terminals into digital communications in said second protocol at said second group of terminals through said first protocol processor and then said second protocol processor; and
translating digital communications in said second protocol provided at said second group of terminals into digital communications in said first protocol at said first group of terminals through said second protocol processor and then said first protocol processor.

19. A method for plug-and-play compatibility as recited in claim 18, wherein enabling said first protocol driver includes selecting said first protocol driver from a collection of drivers stored in memory coupled to said first protocol processor.

20. A method for plug-and-play compatibility as recited in claim 18, wherein enabling said first protocol driver includes downloading said first protocol driver through said first group of terminals to memory coupled to said first protocol processor.

21. A protocol translation circuitry for plug-and-play capability, comprising:

a first group of terminals for receiving first digital communications in a first protocol;

a second group of terminals for receiving second digital communications in a second protocol;

a first protocol processor coupled to said first group of terminals; and a second protocol processor coupled to said second group of terminals, wherein said first protocol processor determines said first protocol received at said first group of terminals and enables in said first protocol processor a first driver appropriate to said determined first protocol, and said second protocol processor determines said second protocol received at said second group of terminals and enables in said second protocol processor a second driver appropriate to said determined second protocol, wherein said first digital communications provided at said first group of terminals in said first protocol are translated through said first protocol processor and then said second protocol processor into translated first digital communications in said second protocol at said second group of terminals, and said second digital communications received at said second group of terminals in said second protocol are translated through said second protocol processor and then said first protocol processor into translated second digital communications in said first protocol at said first group of terminals.

22. A protocol translation circuitry as recited in claim 21, further comprising memory coupled to said first protocol processor, wherein said memory stores a collection of protocol drivers, and said first protocol processor selects said first protocol driver from said collection of protocol drivers.

23. A protocol translation circuitry as recited in claim 21, further comprising a memory coupled to said first protocol processor, wherein said first protocol driver is loaded through said first group of terminals into said memory.

24. A cable assembly for plug-and-play capability between a first apparatus capable of digitally communicating with a first protocol through a first apparatus connector and a second apparatus capable of digitally communicating with a second protocol through a second apparatus connector, said cable assembly comprising:

a first cable connector adapted to be coupled to said first apparatus connector;

a second cable connector adapted to be coupled to said second apparatus connector;

an electrical cable coupling said first cable connector to said second cable connector, said electrical cable including a plurality of conductors;

a translation circuitry for translating digital communications provided at said first apparatus connector in said first protocol into digital communications at said second apparatus connector in said second protocol, and for translating digital communications provided at said second apparatus connector in said second protocol into digital communications at said first apparatus connector in said first protocol; and wherein said translation circuitry determines said first protocol and said second protocol, and enables a first protocol driver appropriate to said determined first protocol and a second protocol driver appropriate to said determined second protocol in said translation circuitry.

25. A cable assembly as recited in claim 24, wherein said translation circuitry includes memory that stores a collection of protocol drivers, and said translation circuitry selects at least one of said first protocol driver and said second protocol driver from said collection of protocol drivers.

26. A cable assembly as recited in claim 24, wherein said translation circuitry includes memory, and at least one of said first protocol driver and said second protocol driver is loaded through at least one of said first cable connector and said second cable connector into said memory.

27. A protocol translator for plug-and-play capability, comprising:

a first group of terminals for receiving first digital communications in a first protocol;

a second group of terminals for receiving second digital communications in a second protocol; and a translation circuitry provided between said first group of terminals and said second group of terminals, wherein said translation circuitry determines said first protocol received at said first group of terminals and said second protocol received at said second group of terminals, and enables a first protocol driver appropriate to said determined first protocol and a second protocol driver appropriate to said determined second protocol in said translation circuitry, such that said translation circuitry translates said first digital communications in said first protocol provided at said first group of terminals into translated first digital communications in said second protocol at said second group of terminals, and also translates said second digital communications in said second protocol provided at said second group of terminals into translated second digital communications in said first protocol at said second group of terminals.

28. A protocol translator as recited in claim 27, further comprising memory coupled to said translation circuitry, wherein said memory stores a collection of protocol drivers, and said translation circuitry selects at least one of said first protocol driver and said second protocol driver from said collection of protocol drivers.

29. A protocol translator as recited in 27, further comprising memory coupled to said translation circuitry, wherein at least one of said first protocol driver and said second protocol driver is loaded through at least one of said first group of terminals and said second group of terminals into said memory.

30. A method for plug-and-play compatibility of a protocol translation circuitry, said method comprising:

determining a first communication protocol received at a first group of terminals of said protocol translation circuitry;

enabling a first protocol driver appropriate to said determined first protocol in said protocol translation circuitry;

determining a second communication protocol received at a second group of terminals of said protocol translation circuitry;

enabling a second protocol driver appropriate to said determined second protocol in said protocol translation circuitry;

translating digital communications in said first protocol provided at said first group of terminals into digital communications in said second protocol at said second group of terminals through said translation circuitry; and translating digital communications in said second protocol provided at said second group of terminals into digital communications in said first protocol at said first group of terminals through said translation circuitry.

31. A method for plug-and-play compatibility as recited in claim 30, wherein enabling said first protocol driver includes selecting said first protocol driver from a collection of drivers stored in memory coupled to said translation circuitry.

32. A method for plug-and-play compatibility as recited in claim 30, wherein enabling said first protocol driver includes downloading said first protocol driver through said first group of terminals to a read/write memory coupled to said translation circuitry.

33. A system comprising:
- a first apparatus capable of digitally communicating with a first protocol through a first apparatus connector;
- a second apparatus capable of digitally communicating with a second protocol through a second apparatus connector; and
- a cable assembly connecting said first apparatus to said second apparatus, said cable including:
  - a first connector having a first plurality of pins;
  - a second connector having a second plurality of pins;
  - an electrical cable coupling said first connector to said second connector, said electrical cable including a plurality of conductors; and
  - translation circuitry coupled to at least some of said plurality of conductors of said electrical cable at points between ends of said first plurality of pins of said first connector and ends of said second plurality of pins of said second connector, said translation circuitry deriving its power from said electrical cable, said translation circuitry including a first protocol processor communicating with said first connector and a second protocol processor communicating with said second connector, said first protocol processor and said second protocol processor being coupled together for mutual communication, such that said first protocol processor is capable of first communicating with a first apparatus via said first connector with said first protocol and such that said second protocol processor is capable of communicating with a second apparatus via said second connector with said second protocol, said first protocol being different from said second protocol.

* * * * *